United States Patent [19]

O'Dell

[11] 3,816,978

[45] June 18, 1974

[54] FILTER ARRANGEMENT
[75] Inventor: Leonard J. O'Dell, Louisville, Ky.
[73] Assignee: American Air Filter Company, Inc., Louisville, Ky.
[22] Filed: Oct. 18, 1971
[21] Appl. No.: 190,251

[52] U.S. Cl............................ 55/96, 55/302, 55/341
[51] Int. Cl.............................................. B01d 46/04
[58] Field of Search....... 55/96, 283, 302, 303, 361; 210/333

[56] References Cited
UNITED STATES PATENTS

| | | | |
|---|---|---|---|
| 1,163,318 | 12/1915 | Bryant | 55/293 |
| 3,318,452 | 5/1967 | Adams | 210/333 |
| 3,509,698 | 5/1970 | Medcalf et al. | 55/302 |
| 3,606,736 | 9/1971 | Leliaert et al. | 55/341 |
| 3,630,005 | 12/1971 | Reinauer | 55/302 |

FOREIGN PATENTS OR APPLICATIONS

| | | | |
|---|---|---|---|
| 909,345 | 10/1962 | Great Britain | 55/294 |

Primary Examiner—Bernard Nozick

[57] ABSTRACT

A gas cleaning arrangement of the type having gas permeable tubular filter elements through which a gas stream is passed to remove particulate matter therefrom, the filtered gas stream being subsequentially exited from the tubular elements with sources of compressed gas being provided to selectively direct opposed pulses of compressed gas along the inner surface of the tubular elements.

10 Claims, 6 Drawing Figures

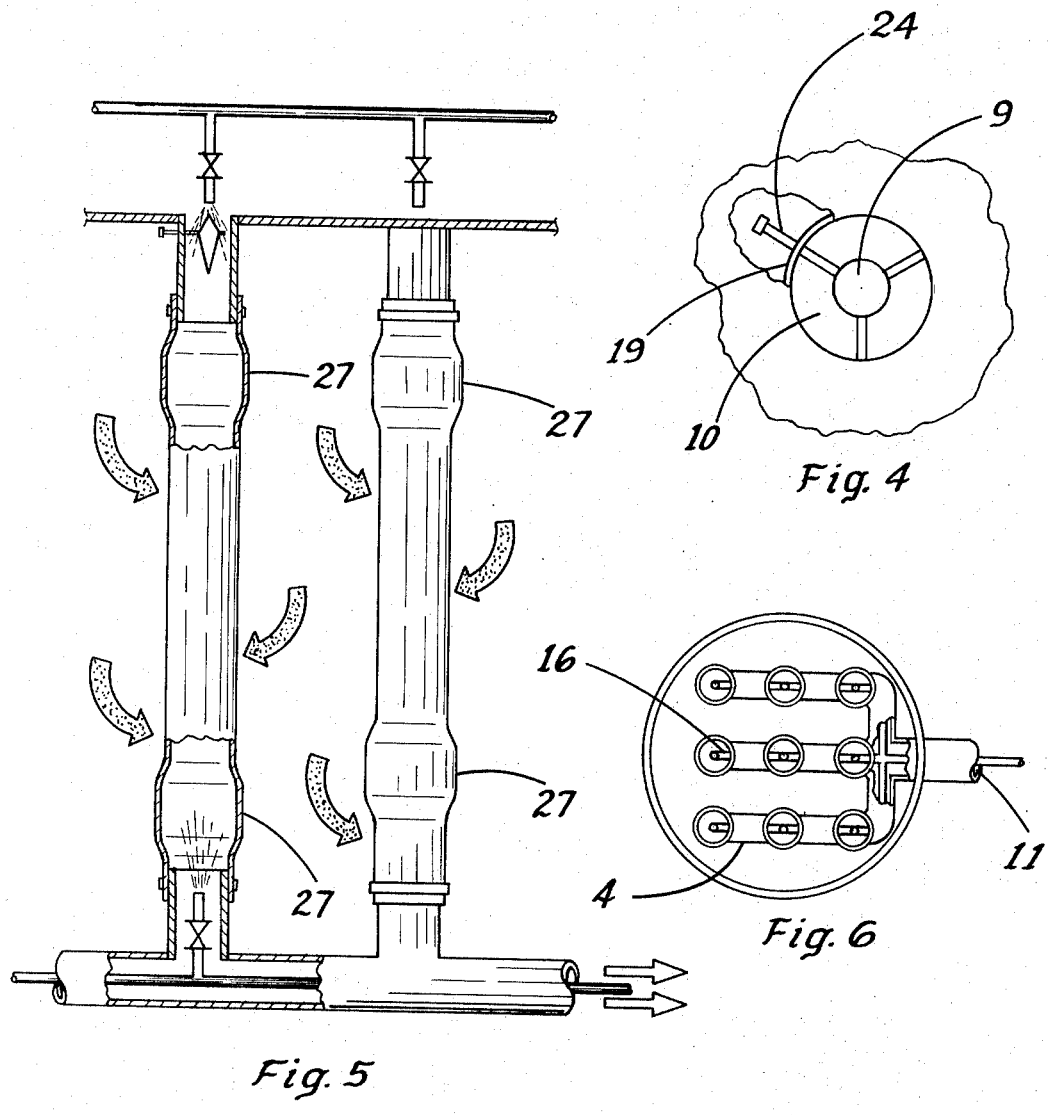

FILTER ARRANGEMENT

BACKGROUND OF THE INVENTION

In filtering apparatus where a stream of gas, for example gas containing particulate matter, is passed through gas permeable filter means to remove such particulate matter, accumulation of particulate matter on the surface of the filter undesirably restricts the flow of gas therethrough. In previous apparatus, various means have been provided to remove the accumulated particulate material from the surface of the filter. Some apparatus has included means to periodically direct high velocity jets of gas normal to the surface where the particulate material is accumulated to clean the filtering surface. Such arrangements are expensive and require complicated apparatus to move the cleaning jets over the surface. Because of the number of moving parts required and the complexity of the cleaning operation the equipment is subject to failure, and objectionable maintenance expenses are often incurred. Furthermore, directing a jet of high velocity gas toward the filter surface undesirably abrades the surface and, in many cases, instead of completely removing the particulate materials from the surface a portion of the accumulated material is embedded in the filter media.

In previous apparatus where fabric tubular filter elements have been used, shaker means have been provided to periodically shake the tubular filter elements to mechanically remove the accumulated particulate material from the filter surface. However, such arrangements are complicated, and vibration of the tubular elements often causes damage to the equipment, flex fatigue of the filter media, and early failure of one or both.

In other gas cleaning apparatus, means have been provided to periodically reverse the filtering flow of gas through the permeable filter element so that accumulated materials are blown off the filter surface by the reverse flow of gas. For example, in a previous apparatus, where tubular gas permeable filter elements have been provided and the flow of gas is from the outside through the tubular element and into the central chamber, the filter surface has been cleaned by introducing a high energy pulse of compressed gas in reverse flow into the filtered gas outlet of the tubular element. The high energy pulse extended over the entire cross-sectional area of the tubular member and passed along a portion of the length of the tubular element. In such apparatus the length of the tubular member which can be cleaned by such previous arrangement is severely limited regardless of the pressure of the compressed gas and the geometric configuration of the tubular element. Furthermore, it has been recognized that periodically reversing the flow of gas in the entire tubular filter element during the cleaning cycle significantly reduces the maximum capacity, in cubic feet per hour, of the gas cleaning apparatus.

In still another previous apparatus where tubular gas permeable filter elements have been provided and the flow of gas is from the outside through the tubular element and into the central chamber, the filter surface has been cleaned by introducing a high energy pulse of cleaning gas into the central chamber of the tubular element so that the high energy pulse of cleaning gas travels along the inside of the tubular element, generally in the same direction that filtered gas travels after entering the element. This apparatus has the advantage that it is not necessary to interrupt normal filtering operations to effect cleaning of the filter elements.

All of the above described apparatus have however failed to provide a means by which extremely long tubular elements can be effectively cleaned. Such long tubular elements are, however, rapidly becoming the standard of the industry since greater emphasis on environmental pollution control has caused increased concern in regard to preventing air pollution. Long filter element tubes furnish the advantage of a large filter surface area while occupying only a minimum of floor space. The invention of this disclosure solves the problem of cleaning extremely long filter element tubes.

SUMMARY OF THE INVENTION

In accordance with the present invention an efficient inexpensive apparatus is provided to periodically clean a tubular filter, which does not require complicated expensive valving and gas bypass arrangements. Furthermore, the present invention provides an apparatus to effeciently clean the filter surface of a gas permeable tubular fabric filter without the use of complicated shaker mechanism or without a multiplicity of air jets to direct a stream of high velocity gas normal to the filter surface.

Moreover, the present invention provides: an apparatus for filtering particulate matter from a gaseous stream comprising:

a casing having an upstream gas inlet means and a downstream gas outlet means, at least one tubular gas permeable filter element having an upstream end and a downstream end, filter element securing means to secure each tubular gas permeable filter element generally longitudinally within the casing with its downsteam end in flow communication with the downstream gas outlet means, a hopper integral with and defined by the lower portion of the casing and, cleaning means for cleaning each tubular gas permeable filter element, the cleaning means having:

a. at least one set of two opposed nozzle means, one nozzle being disposed with respect of each end of each tubular gas permeable filter element;

b. gas release means to simultaneously, selectively release two opposed pulses of compressed cleaning gas through each set of the nozzle means longitudinally along the inside surface of each tubular gas permeable filter element, the cleaning gas release means being in flow communication with the nozzle means and supporting the nozzle means within the tubular filter element.

Various other features of the present invention will become obvious to those skilled in the art upon reading the portion of the disclosure set forth hereinafter.

DESCRIPTION OF THE DRAWINGS

FIG. 4 is an enlarged cross-sectional view taken along a plane passing through line 4—4 of FIG. 1.

FIG. 5 is a schematic drawing illustrating the operation of the apparatus in accordance with the present invention.

FIG. 6 is a view taken along a plane passing through line 6—6 of FIG. 1.

DESCRIPTION OF THE PREFERRED EMBODIMENT

Figure 1:
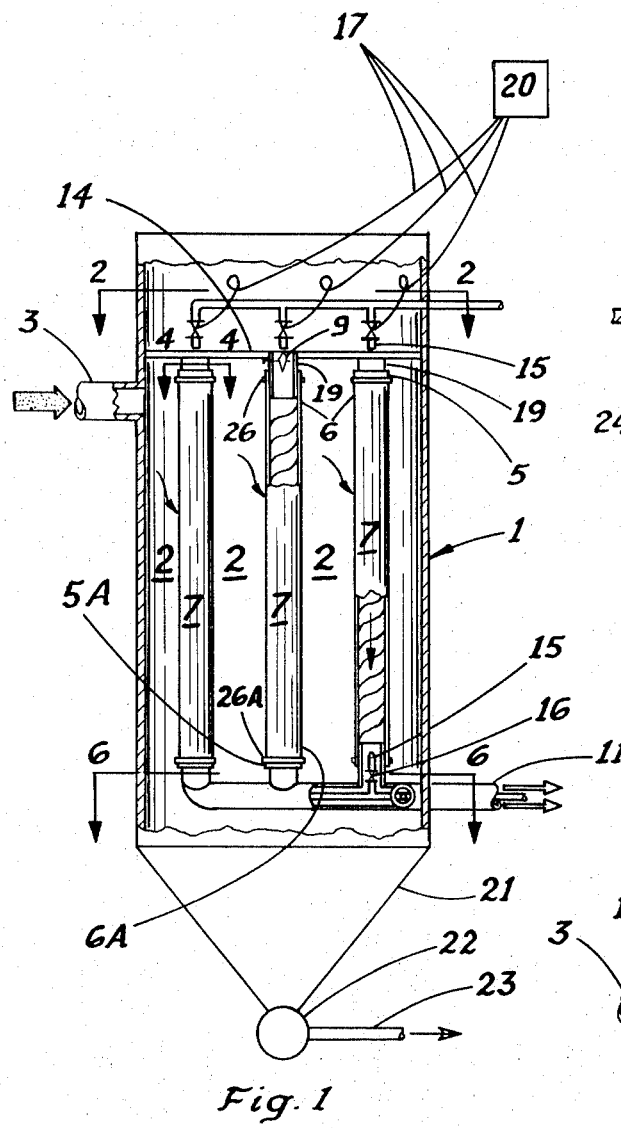
FIG. 1 is an elevational view in section of an apparatus in accordance with the present invention.

As shown in FIG. 1, a gas cleaning arrangement in accordance with the present invention can include generally a casing 1 defining a gas inlet chamber 2 having an upstream gas inlet means 3 and a downstream gas outlet means 11 and upper and lower filter element securing means 5 and 5A, respectively, to secure tubular gas permeable filter elements 7 in generally longitudinal relation within casing 1. As shown by the arrows, dirty gas enters upstream gas inlet means 3 and passes into gas inlet chamber 2. It is then filtered as it passes through the walls of tubular gas permeable filter elements 7. The filtered gas leaves casing 1 through downstream gas outlet means 11. Particulate matter carried by the dirty gas entering the chamber is deposited on the outer surface of filter elements 7, and is removed therefrom by means hereinafter described. Such particulate matter is collected in hopper 21 and is removed therefrom through discharge outlet 23 by means of a feeder mechanism 22, for example, a rotary gas lock feeder.

Various filter element securing means 5 and 5A, can be provided to secure the tubular gas permeable filter elements 7 within casing 1. Each tubular filter element 7 is secured at its first upper end 6 to corresponding downwardly extending tubular projections 19. The second ends 6A of the filter elements 7 are secured in flow relation to gas outlet manifold means 4 by securing means 5A. In both cases securing can be accomplished by any one of several well-known means such as bands 26 which can be drawn tight by means of screw fasteners 26A.

A plate means 14 is provided to extend across casing 1 at an end opposite gas outlet manifold means 4 to define a plenum chamber 12. Plate means 14 includes a number of downwardly extending tubular projections 19, one in aligned relation with and connected to each of first ends 6 of tubular filter elements 7. First ends 6 of tubular elements 7 and tubular projections 19 are in cooperative paired flow relation and are advantageously disposed so each filter element 7 extends generally from a tubular projection 19 in substantially parallel longitudinal relation within casing 1. Tubular filter elements 7 can be of any desired cross-sectional geometric configuration for example, circular, and can be made of selected materials for example, nylon fabric of selected pore size, depending upon the particulate matter to be removed from the gas stream and the desired removal efficiency. When fabric filter elements are used stiffener means 13 for example, coiled helices of spring steel can be provided inside each tubular filter element to support the tubular element in the desired configuration against the pressure differential which exists between the inside and outside of the tube and also to restrict lateral movement of tubular filter elements 7 within casing 1.

Figure 3:
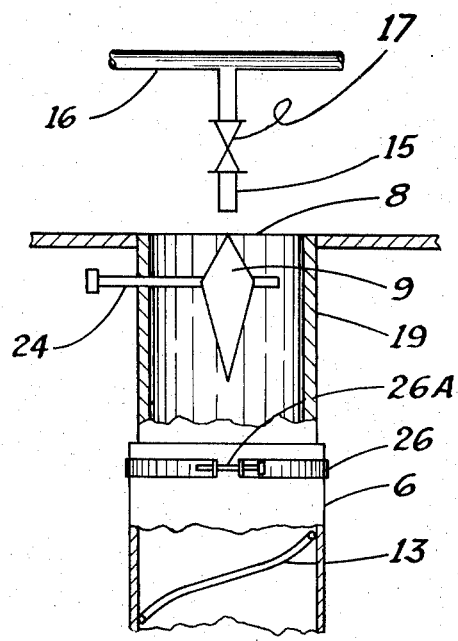
FIG. 3 is an enlargement of a fragmentary cross-sectional view taken along a plane passing through line 3—3 of FIG. 2.
Figure 2:
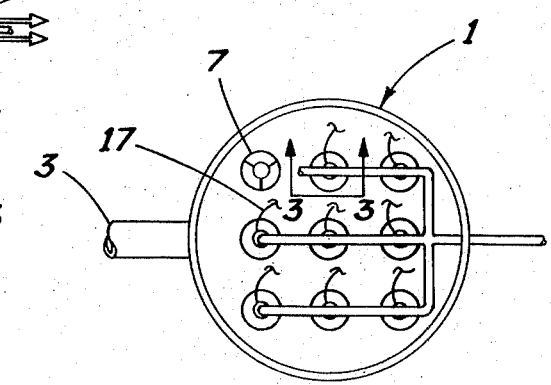
FIG. 2 is a cross-sectional view taken along a plane passing through line 2—2 of FIG. 1.

As shown in FIG. 3 each tubular projection 19 of plate means 14 defines an opening 8 to permit introduction of compressed gas to each of tubular filter elements 7 as hereinafter described and in accordance with this invention.

Further, in accordance with the present invention, gas outlet manifold means 4 is provided in casing 1. As shown in FIG. 6, gas outlet manifold means 4 is provided with a selected number of inlets in a particular configuration depending upon the size of casing 1, the number of filter elements 7 to be included in the casing and the desired spacing between the filter elements. Gas outlet manifold means 4 is in flow communication with downstream gas outlet means 11 to provide an exit for the cleaned gas as well as the filter element cleaning gas as described below.

Contained within gas outlet manifold means 4 are a plurality of nozzle means 15. Each nozzle means being one of a set of two nozzle means 15 which are opposedly directed longitudinally along the inside surface of each of filter elements 7. The other of said set of two opposed nozzle means 15 is located inside plenum chamber 12 and circumferentially with respect to tubular projections 19. Each set of two opposed nozzle means 15 is positioned so as to direct opposed streams of compressed gas toward each other along the inside surface of each tubular gas permeable filter element 7. The effect of directing opposed gas streams along each of the inside surfaces of tubular gas permeable filter elements 7 is to effect cleaning thereof simultaneously from both the top and the bottom. Such cleaning from the top of each filter element alone is described in U.S. Pat. No. 3,509,698 which is hereby incorporated by reference. Each nozzle of set 15 can include a valve 16 for example, a solenoid valve connected to an electrical source 20 by means of wires 17 to be selectively opened to provide a stream of compressed gas. The electrical source 20 (not shown in detail) can include opening means, for example, time cycle means, to sequentially open valves 16 to provide opposed pulses of compressed air to clean tubular gas permeable filter elements 7. The timing sequence can be such that all of the valves 16 open at one time or a set of valves can be separately operated on an individual basis to selectively clean one tubular gas permeable filter element 7 at a time.

A plurality of elongate gas diffuser means 9 of selected configuration can optionally be disposed, one advantageously in generally concentric relation in each of tubular elements 7 to define an annular opening 19 (FIG. 4) between the outer periphery of diffuser means 9 and the inner periphery of said tubular element 7. Diffuser means 9 can be of various configurations and whereas in the example of the figures, opening 8 is circular the diffuser can be conical with the axis of each cone in generally parallel alignment with the axis of its respective tubular element 7, and with the apex thereof pointing outwardly therefrom. In the example of the figures, diffuser means 9 are in the shape of a pair of cones of equal base dimensions but different height dimensions where the cones are in contiguous base to base relation with the axis of the resulting double cone in substantial concentric alignment with the longitudinal axis of its corresponding tubular element 7. Diffuser means 9 can in some cases be welded into tubular projections 19 in fixed relation, or for example, as shown in the figures, can be supported within openings 8 by means of cooperative threaded screws 24 as seen in FIGS. 3 and 4, threaded screws 24 are received by threaded openings in tubular projections 19.

In operation, dirty gas enters dirty gas inlet chamber 2 through upstream gas inlet means 3. The flow of gas is generally in the direction as shown by the arrows of FIGS. 1 and 5. The pressure of the gas in dirty gas inlet chamber 2 can be subatmospheric or superatmospheric depending on the particular application of the gas cleaning device. The gas entering the upstream gas inlet means 3 passes through tubular gas permeable filter elements 7 from outside to inside. Thus particulate matter is left on the outside surfaces of filter elements 7. The filtered gas then leaves the filter apparatus by traveling down the interior of tubular gas permeable filter elements 7 through gas outlet manifold means 4 and finally out downstream gas outlet means 11. Particulate matter accumulates, on the outer surface of tubular gas permeable filter elements 7, and falls to hopper 21 from which it is removed. The apparatus described herein can be used in various applications. In some of these applications the particulate matter separated from the dirty gas stream is valuable and is desirably recovered while in other cases the material separated from the dirty gas stream is worthless and can be discarded.

Accumulation of the particulate matter separated from the dirty gas stream plugs the pores of the fabric of the tubular pas permeable filter elements 7. It is therefore necessary to periodically remove such particulate matter from the pores of said fabric. In accordance with this invention, it has been discovered that directing two pulses of compressed air, simultaneously emitted from each of a set of two opposed nozzle means 15, in opposed relation to each other along each of the inside surfaces of tubular gas permeable filter elements 7 is very effective in removing particulate matter from the pores of said fabric of tubular gas permeable filter elements 7. The removal of particles from the pores of the filter element fabric results from several factors, which include a sudden reverse pressure differential in a direction counter to the direction of normal gas flow during the filtering operation. A second factor in effecting cleaning of the tubular gas permeable filter element 7 is the total displacement of the filter media in response to the movement of the two opposed gas pulses. Specifically, portions 27 of the filter element 7 are expanded (See FIG. 5). Accumulated particulate material on the surface of tubular gas permeable filter elements 7 is removed by movement of the tubular element resulting from expansion.

Although it is not essential to the practice of this invention it may be desirable to position a second elongate gas diffuser means opposed to the lower of the set of two opposed nozzle means 15 in each of filter elements 7. This second elongate gas diffuser means is completely independent of the optional elongate gas diffuser which may be positioned in working relation at the first ends of said filter elements 7. The effect of such positioning of a second diffuser means 9 is to shape the lower gas pulse into a hollow wave. Such a hollow wave of gas is known to travel further along the inside surface of a filter element and thus maximize the cleaning from a single gas pulse.

In previous apparatus which have included means to provide a pulse of high energy gas through tubular filter elements a single pulse has been directed into the tubular element in a direction either counter to the normal direction of flow of the filtered gas within the element or in a direction cocurrent to the normal direction of the flow of gas within the filter element. However, the prior art does not suggest or make obvious the startling result that when a set of nozzles are operated simultaneously in opposed relation in the same filter element, for example, in the operation of a filter element such as filter element 7 there is obtained more than a 270 percent increase in dust load capability over the dust load capability of a filter apparatus having cleaning gas flow in only one direction. Dust load capability is defined as the maximum amount of dust in grains in per cubic foot which can be continuously filtered from an incoming air stream without causing excessive resistance to gas flow through the filter apparatus. Also, it is significant to note that if a filter apparatus is equipped with a single nozzle located in the upper end of its filter element and data is collected on the total length of cleaned fabric and then subsequently a lower nozzle is inserted and said lower nozzle is operated without operating the upper nozzle, and data is collected on the total length of cleaned fabric, the total combined length of cleaned fabric obtained by operating the nozzles independently will be less than the total length of cleaned fabric of a filter element which is cleaned by operating the nozzles simultaneously. That is to say there will be a synergistic effect when a set of opposed nozzle means 15 are employed in a single tubular gas permeable filter element 7. Such a synergistic effect was heretofore undisclosed in the filter cleaning art. Although the reason for this phenomenon is not known, the following theory is presented without intent to limit the scope of this invention.

It is theorized that as the opposing gas pulses approach each other and meet they are effectively reflected backward in the direction from which they came. Thus, although both pulses are somewhat diminished in strength as they move longitudinally toward the center-most portion of filter element 7, they are reversed and subsequently again sweep the center-most portion of filter element 7. Thus it appears what is lost due to the diminishing pressure of the cleaning gas pulse is compensated for by the fact there occurs a double sweep at least in the center-most portion of each tubular filter element.

In some previous filter apparatus where a single gas pulse was fed either from the top of the filter element or from the bottom of the filter element, filter elements of 6 to 8 or even up to 12 feet were successfully cleaned. However, with the invention of this disclosure, it is possible to successfully clean filter elements of 20 feet or even more.

To further enhance the cleaning efficiency in the present apparatus, upper and lower nozzles of nozzle means 15 could be activated a number of times. Thus, a series of two opposed cleaning pulses would result. In such a series of two opposed pulses, the upwardly and downwardly directed pulses could be released simultaneously, which would result in a collision at approximately the midpoint of the tubular filter element. More preferably however, the release of the upwardly and downwardly directed pulses could be timed to cause their point of collision to vary along the filter element's longitudinal axis, thus the benefit of the magnified shock at the point of collision would be realized at different points along the filter element. Of course, to clean the upper portion of the filter element it would be necessary to activate the lower nozzle means 15, first and then, after a calculated time interval, activate the upper nozzle. Conversely to clean the lower portion of the filter element it would be necessary to activate the upper nozzle of nozzle means 15, first and then, after a calculated time interval, activate the lower nozzle. An effective method of proceeding would be to cause the points of collision to occur sequentially from one end of the filter element to the other. The optimum number of collisions to clean the filter element would, of course, vary depending upon the dust contact and particle size in the dirty gas, the material from which the bag is fabricated and other conditions.

While the Figures illustrate an arrangement where dirty gas flows from the outside to the inside of tubular gas permeable filter elements 7 in filtering flow, it will be recognized that the present invention likewise embraces an arrangement where dirty gas flows from the inside to the outside of the elements in filtering flow. In such an arrangement, it is conceivable that the reverse gas pressure differential will play less of a part in cleaning the filter element 7. However, a third factor, which is relatively insignificant in the cleaning operation of the apparatus shown in the Figures, will become important. This third factor is the sweeping action that the gas pulses have across the inside surface area of the filter elements 7.

Having thus described the invention, what is claimed is:

1. Apparatus for filtering particulate matter from a gaseous stream comprising: a casing having an upstream gas inlet means and a downstream gas outlet means; at least one tubular gas permeable filter element supported within said casing and spaced from said inlet in filtering relationship to gas entering said inlet, said tubular filter element having an upstream end and a downstream end; filter element securing means to secure said tubular gas permeable filter element at its upstream and downstream ends generally longitudinally within said casing with its downstream end in flow communication with said downstream gas outlet means; and, cleaning means located within said casing in cooperative relationship with said tubular gas permeable filter element, said cleaning means including (a) one set of two opposed nozzle means within said tubular filter element, one nozzle of said set of nozzle means being axially aligned and disposed within and spaced from each end of said tubular gas permeable filter element, the openings of said nozzles facing each other so that pulses of cleaning gas emitted therefrom travel along the inside of said tubular filter element, collide and travel in a reverse direction (b) cleaning gas release means in flow communication with said nozzle means capable of simultaneously releasing two opposed pulses of compressed cleaning gas through each set of said nozzle means, longitudinally along the inside surface of each tubular gas permeable filter element.

2. The apparatus of claim 1 comprising in addition, a plurality of elongate gas diffuser means, one centrally disposed within each of said upstream ends of each of said tubular filter elements, each of said gas diffuser means having a substantially gas impervious conically-shaped end directed outwardly from its corresponding tubular filter element, and each of said gas diffuser means being in axial alignment with the nozzle of said set of nozzle means disposed inside said first end of each tubular gas permeable filter element to form an annular opening between the outer periphery of said diffuser means and the inner periphery of said tubular filter element; and means to support said gas diffuser means.

3. The apparatus of claim 2 wherein a second elongate gas diffuser means is centrally disposed within each of said downstream ends of each of said gas permeable filter elements, said second gas diffuser means having a substantially gas impervious conically-shaped end directed outwardly from said tubular filter element and axially aligned with one of said set of nozzle means disposed inside each end of each tubular gas permeable filter element to form an annular opening between the outer periphery of said second diffuser means and the inner periphery of said tubular filter element; and means to support said second gas diffuser means.

4. The apparatus of claim 2 wherein said gas diffuser means include a second conical end having a base section of generally the same size and shape as the base section of said first end with said second end disposed base to base with said first end.

5. The apparatus of claim 1 wherein each of said nozzles of said set of nozzle means is disposed in spaced relationship from the sidewalls of its corresponding tubular filter element.

6. The apparatus of claim 5 wherein each of said nozzles of said set of nozzle means is disposed concentrically with respect to its corresponding end of said tubular gas permeable filter element.

7. An apparatus for removing particulate matter from a gas stream including; a casing having a dirty gas inlet and a clean gas outlet; plate means, having cooperative spaced apertures, disposed across said casing to define a dirty gas inlet chamber, and a plenum chamber, said dirty gas inlet chamber communicating with said dirty gas inlet; gas outlet manifold means located within said casing in flow communication with said clean gas outlet to remove filtered gas from said casing, said manifold means including aperture means in cooperative, generally aligned, relation with said apertures of said plate means; tubular flexible gas permeable filter elements having a first end and a second end, said first end joined to said plate means in flow communication with a selected aperture of said plate means, and said second end joined to said gas outlet manifold means, in flow communication with selected aperture means of said gas outlet manifold means thereby extending in filtering relationship across said dirty gas inlet chamber; a plurality of elongate gas diffuser means corresponding to the number of filter elements, each diffuser means having one generally conically-shaped, substantially gas impervious end disposed within said first end of each filter element with the apex of said gas impervious end directed outwardly with respect to said first end of said tubular filter element, to form an annular opening between the outer periphery of said diffuser and the inner periphery of said tubular filter element; support means to support each diffuser means in generally axially aligned relation with the longitudinal axis of its corresponding tubular filter element; and, cleaning means attached within said casing in cooperative relationship with each tubular gas permeable filter element; said cleaning means having: (a) a plurality of sets of two opposed nozzle means corresponding to the number of tubular filter elements, each set of nozzle means located within a separate filter element with one of said nozzle means of each set concentrically located adjacent to each of said first and second ends of each tubular filter element, said nozzle means adjacent said first end of said tubular filter element having an outlet of smaller area than said aperture of said plate means, said nozzle facing the apex of said gas impervious end of said diffuser means to direct a pulse of compressed gas toward said diffuser means so said gas pulse flows over said substantially gas impervious end, expands through said annular opening formed thereby to be shaped into an annular wave which travels along a portion of the inside of said tubular element toward said gas outlet manifold; said nozzle means adjacent said second end being disposed inside said outlet manifold means to direct a pulse of compressed gas counter to the pulse of gas of said nozzle means located adjacent said first end of said tubular filter, said pulse of gas traveling along a portion of the inside of said tubular element toward said plate means; and, (b) cleaning gas release means in flow communication with and supporting said sets of opposed nozzle means, capable of simultaneously releasing two opposed pulses of compressed cleaning gas through each of said sets of opposed nozzle means.

8. In a process for cleaning non-rigid filter media in dust collection systems wherein during said filtering operation the gas to be cleaned flows in a system defined path which inlcudes said gas entering into a fabric tubular filter element through its sidewall from the outside and exiting from the interior thereof with said tubular gas filter element retaining a portion of said dust on its upstream side, the improvement comprising: selectively releasing a series of first and second opposed cleaning gas pulses from a set of two nozzles, one nozzle of said set located within and spaced from each end of said tubular gas filter element said pulses being directed along the longitudinal axis inside said tubular filter element toward its center, the release of said opposed cleaning gas pulses being timed so that the points of collision of said series of first and second opposed pulses occurs at spaced intervals along the longitudinal axis of said tubular filter element.

9. The process of claim 8 wherein the release of said series of first and second opposed cleaning gas pulses is timed so that said points of collision occur at spaced intervals sequentially from one end of said tubular filter element to the other.

10. The process of claim 8 wherein the release of said series of first and second opposed cleaning gas pulses is simultaneous so that said points of collision only occur approximately equidistant from the ends of tubular filter element.

* * * * *